US012108260B2

(12) United States Patent
Anderson et al.

(10) Patent No.: US 12,108,260 B2
(45) Date of Patent: Oct. 1, 2024

(54) INTEGRATED NETWORK DEPLOYMENT TOOL

(71) Applicant: AT&T Intellectual Property I, L.P., Atlanta, GA (US)

(72) Inventors: Christopher T. Anderson, Anna, TX (US); Christopher Gregston, Fenton, MO (US); Shaunna Levell, Stone Mountain, GA (US); Julie McNew, Jenks, OK (US); Barbara Adcock, Avondale Estates, GA (US); Brandon Roche, Columbia, IL (US); Rick Williams, Alabaster, AL (US); Judy Banker, St. Louis, MO (US); Stacy Jackiewicz, Holmden, NJ (US); Irma Mix, Bourbonnais, IL (US); Kristen Hyslope, Ferndale, MI (US); Yongmei Chen, Suwanee, GA (US); Saurav Vasishat, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 342 days.

(21) Appl. No.: 17/730,455

(22) Filed: Apr. 27, 2022

(65) Prior Publication Data

US 2023/0354050 A1 Nov. 2, 2023

(51) Int. Cl.
*H04W 16/18* (2009.01)
*G06Q 10/0639* (2023.01)
*H04W 24/06* (2009.01)

(52) U.S. Cl.
CPC ........ *H04W 16/18* (2013.01); *G06Q 10/0639* (2013.01); *H04W 24/06* (2013.01)

(58) Field of Classification Search
CPC ... H04W 16/18; H04W 24/06; G06Q 10/0639
See application file for complete search history.

(56) References Cited

U.S. PATENT DOCUMENTS 5,963,867 A 10/1999 Reynolds et al.
6,336,035 B1 1/2002 Somoza et al.
(Continued)

FOREIGN PATENT DOCUMENTS

WO 0172072 A1 9/2001
WO 2009083035 A1 7/2009

OTHER PUBLICATIONS

"Deep Networks for Earth Observation", GitHub—nshaud/DeepNetsForEO: Deep networks for Earth Observation; https://github.com/nshaud/DeepNetsForEO, May 7, 2019.
(Continued)

*Primary Examiner* — Adam D Houston
(74) *Attorney, Agent, or Firm* — Guntin & Gust, PLC; Andrew Gust

(57) ABSTRACT

Aspects of the subject disclosure may include, for example, receiving network requirements for a new telecommunications network to be developed by a network operator, developing a workflow for design and development of the new telecommunications network based on stored knowledge base data about past telecommunications network projects of the network operator, the stored knowledge base data including information about prior milestone processes of the past telecommunications network projects of the network operator, modifying the information about prior milestone processes based on the network requirements for the new telecommunications network, forming a plurality of milestone processes for the new telecommunications network, and performing respective milestone processes of the plurality of milestone processes to design, develop and test the new telecommunications network, including performing a network ready milestone process of final testing of network functions and a certification that the new telecommunications network is operational to begin initiating operation
(Continued)

of the new telecommunications network. Other embodiments are disclosed.

20 Claims, 8 Drawing Sheets

(56) References Cited

U.S. PATENT DOCUMENTS

| | | | |
|---|---|---|---|
| 8,902,767 B2 | 12/2014 | Custer et al. | |
| 9,736,649 B1 | 8/2017 | Do et al. | |
| 9,825,820 B2 | 11/2017 | Custer et al. | |
| 10,043,591 B1* | 8/2018 | LaBorde | G06N 3/08 |
| 10,425,832 B1 | 9/2019 | Zawadzki et al. | |
| 10,455,540 B2 | 10/2019 | Balappanavar et al. | |
| 10,693,730 B2 | 6/2020 | Harpur et al. | |
| 10,728,769 B1 | 7/2020 | Jotshi et al. | |
| 11,386,094 B2* | 7/2022 | Hsiao | G06F 16/168 |
| 11,961,051 B1* | 4/2024 | Spear | H04L 67/02 |
| 2006/0083170 A1 | 4/2006 | Silva et al. | |
| 2006/0106530 A1 | 5/2006 | Horvitz et al. | |
| 2007/0088709 A1 | 4/2007 | Bailey et al. | |
| 2010/0014441 A1 | 1/2010 | Middleton-Hand et al. | |
| 2011/0194456 A1 | 8/2011 | Fordham et al. | |
| 2013/0024880 A1* | 1/2013 | Moloney-Egnatios | G06Q 30/00 725/14 |
| 2016/0037356 A1 | 2/2016 | Bathula et al. | |
| 2016/0078272 A1 | 3/2016 | Hammoud | |
| 2016/0323417 A1* | 11/2016 | Spear | H04L 67/10 |
| 2017/0041806 A1 | 2/2017 | Randall et al. | |
| 2017/0257778 A1 | 9/2017 | Priest | |
| 2018/0139623 A1 | 5/2018 | Park et al. | |
| 2018/0157911 A1 | 6/2018 | Lo et al. | |
| 2019/0075430 A1 | 3/2019 | Lincoln et al. | |
| 2019/0354741 A1 | 11/2019 | Yang | |
| 2019/0373326 A1* | 12/2019 | Han | H04N 21/4725 |
| 2020/0082168 A1 | 3/2020 | Fathi et al. | |
| 2020/0096999 A1 | 3/2020 | Pellerite et al. | |
| 2020/0104503 A1 | 4/2020 | Iwasaki et al. | |
| 2020/0178085 A1 | 6/2020 | Ertimo et al. | |
| 2020/0304219 A1 | 9/2020 | Park et al. | |
| 2020/0364596 A1* | 11/2020 | Zang | G06F 18/217 |
| 2020/0396134 A1 | 12/2020 | Jotshi et al. | |
| 2021/0014698 A1* | 1/2021 | Meier-Hellstern | H04W 16/22 |
| 2021/0110328 A1* | 4/2021 | Hsiao | G06F 16/2358 |
| 2022/0094604 A1 | 3/2022 | Jotshi et al. | |
| 2023/0354050 A1* | 11/2023 | Anderson | H04W 16/18 |

OTHER PUBLICATIONS

"DigitalGlobe", Elevate your perspective. MDS, Radian Solutions, SSL; http://digitalglobe.com 2019.
"Nearmap", Park Your Truck, https://go.nearmatp.com/, 2019.

* cited by examiner

INTEGRATED NETWORK DEPLOYMENT TOOL

FIELD OF THE DISCLOSURE

The subject disclosure relates to an integrated network deployment tool for telecommunication networks.

BACKGROUND

Telecommunications companies who operate communications networks and provide communications services need to better understand how to scale and deploy their networks. Over the next several years, such telecommunications companies will be making record capital investments in the growth of their respective wireless communications and fiber networking footprints. Statistics show that over the next three years, the data demand will increase at a rate five times compared to that of today.

BRIEF DESCRIPTION OF THE DRAWINGS

Reference will now be made to the accompanying drawings, which are not necessarily drawn to scale, and wherein.

DETAILED DESCRIPTION

Figure 1:
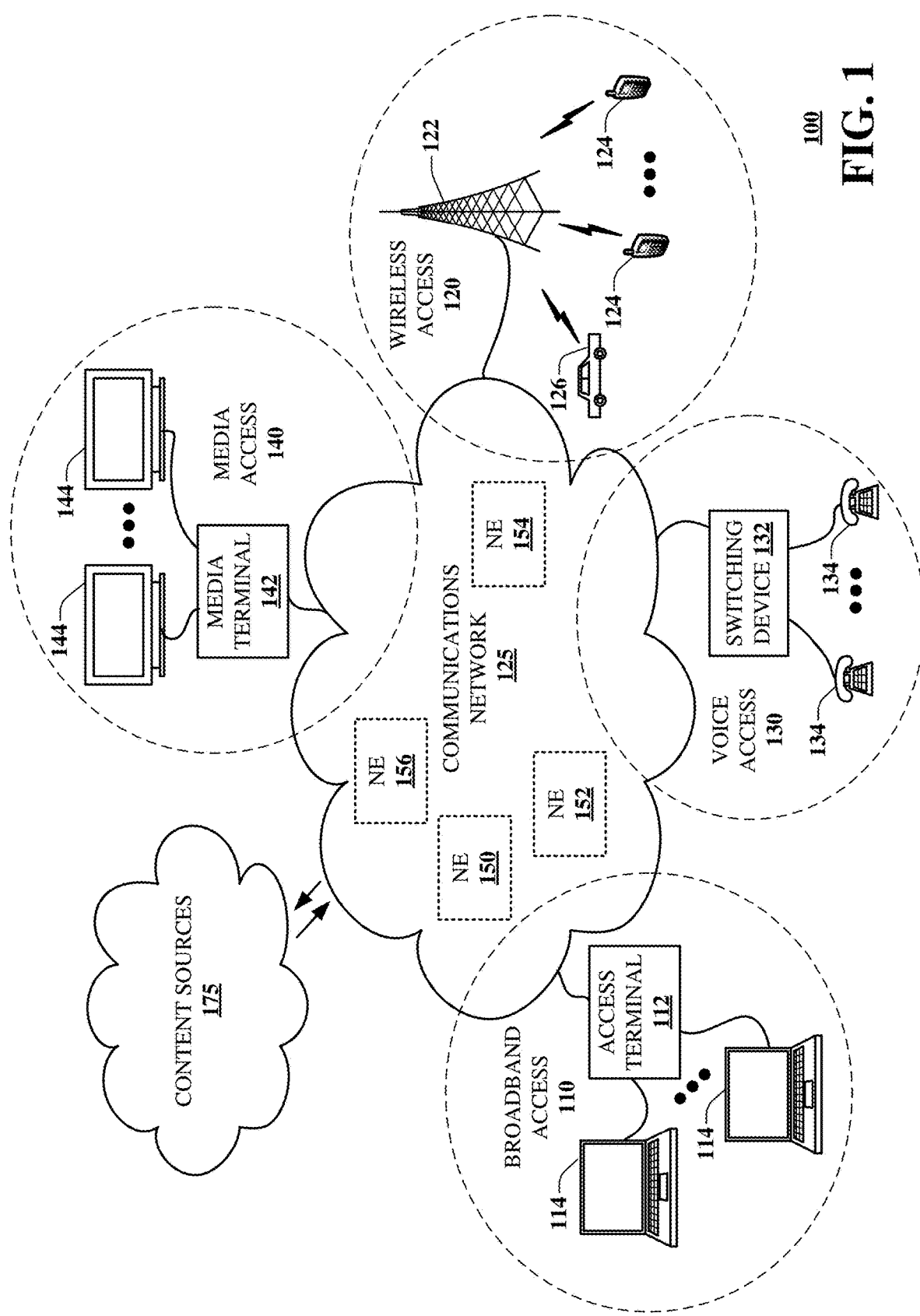
FIG. 1 is a block diagram illustrating an exemplary, non-limiting embodiment of a communications network in accordance with various aspects described herein.

The subject disclosure describes, among other things, illustrative embodiments for a network deployment tool that may be reused for developing different types of telecommunications networks by a network operator. The network development tool uses a knowledge base of information about prior networks developed by the network operator to automate and expedite the development of a new telecommunications network. The network deployment tool receives input information about requirements and constraints for the new telecommunications network. The network deployment tool develops a workflow including a plurality of milestone processes that automatically control the design, development, build-out and testing of the new telecommunications network. The workflow is based on the knowledge base of information about the prior networks developed by the network operator. Other embodiments are described in the subject disclosure.

One or more aspects of the subject disclosure include receiving network requirements for a new telecommunications network, retrieving stored knowledge base data about past telecommunications network projects, and based on the network requirements for the new telecommunications network and the stored knowledge base data, developing a workflow for development of the new telecommunications network, the workflow including a plurality of milestone processes. Aspects of the subject disclosure further include based on the network requirements for the new telecommunications network and the stored knowledge base data, developing an orchestrator for automatically managing the development of the new telecommunications network, performing respective milestone processes of the plurality of milestone processes and initiating operation of the new telecommunications network.

One or more aspects of the subject disclosure include receiving network requirements for a new telecommunications network to be developed by a network operator, retrieving stored knowledge base data about past telecommunications network projects of the network operator, and developing a workflow for development of the new telecommunications network, the workflow including a plurality of milestone processes, each respective milestone process related to a respective aspect of development of the new telecommunications network, wherein the developing the workflow is based on the network requirements and the stored knowledge base data. Aspects of the subject disclosure further include automatically collecting progress information of the plurality of milestone processes, automatically sharing the progress information among selected milestone processes of the plurality of milestone processes, storing at least some of the progress information as updated knowledge base data and upon completion of all milestone processes of the plurality of milestone processes, initiating operation of the new telecommunications network.

One or more aspects of the subject disclosure include receiving network requirements for a new telecommunications network to be developed by a network operator, developing a workflow for design and development of the new telecommunications network based on stored knowledge base data about past telecommunications network projects of the network operator, the stored knowledge base data including information about prior milestone processes of the past telecommunications network projects of the network operator, modifying the information about prior milestone processes based on the network requirements for the new telecommunications network, forming a plurality of milestone processes for the new telecommunications network, and performing respective milestone processes of the plurality of milestone processes to design, develop and test the new telecommunications network, including performing a network ready milestone process of final testing of network functions and a certification that the new telecommunications network is operational to begin initiating operation of the new telecommunications network.

Referring now to FIG. 1, a block diagram is shown illustrating an example, non-limiting embodiment of a system 100 in accordance with various aspects described herein. For example, system 100 can facilitate in whole or in part developing a new telecommunications network, of any technology and capability, using automated processes and workflows based on input conditions and stored historical information about past network development projects. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
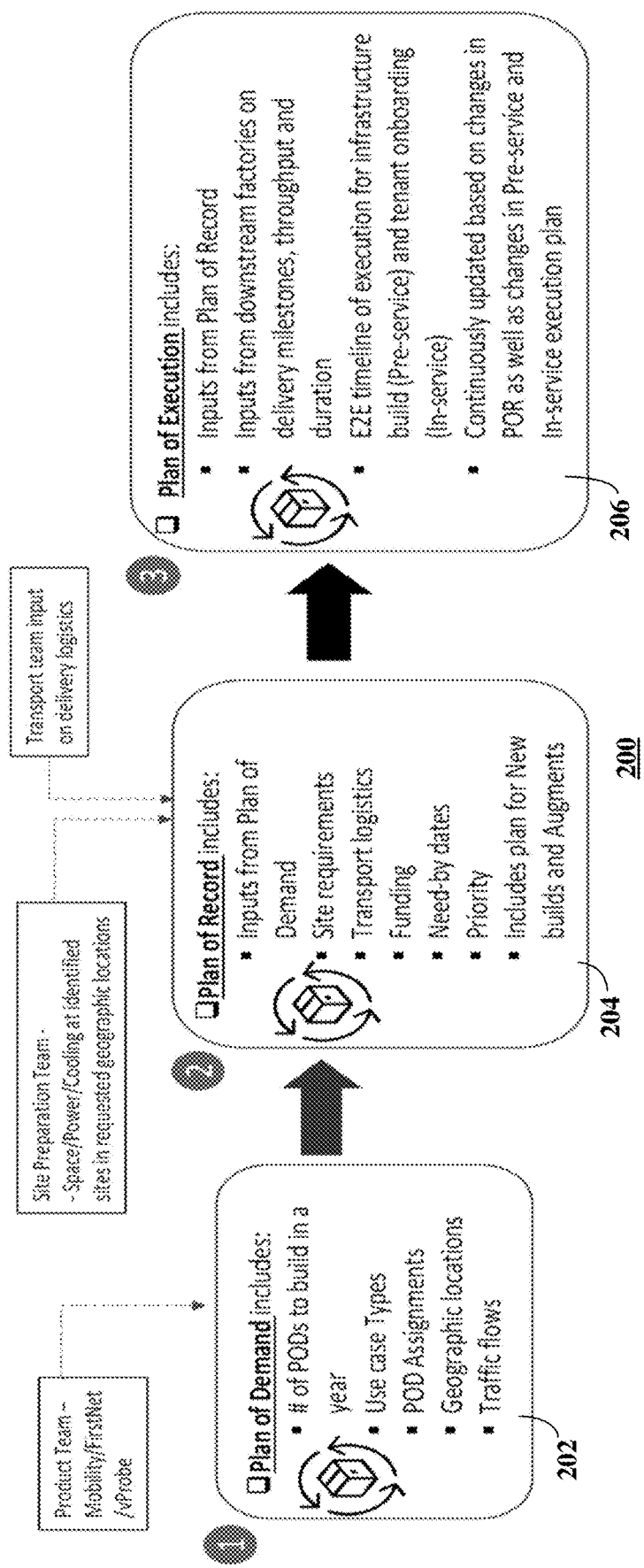
FIG. 2A is a block diagram illustrating an example, non-limiting embodiment of functional block diagram illustrating operation of an integrated network deployment system functioning within the communication network of FIG. 1 in accordance with various aspects described herein.

FIG. 2A is a block diagram illustrating an example, non-limiting embodiment of a functional block diagram of an integrated network deployment system 200 functioning within the communication network of FIG. 1 in accordance with various aspects described herein. The integrated network deployment system 200 may be used by a telecommunications network operator or a telecommunications network service provider to plan, design, deploy and evaluate communication networks. Examples of such communication networks include the communications network 125, the broadband access 110, the wireless access 120, the voice access 130 and the media access 140 of FIG. 1.

Many telecommunications network operators or a telecommunications network service providers (generally, network operators) are focusing on improving core network connectivity, along with deployment of next-generation wireless networks and fiber-based technologies to increase broadband offerings to customers. Next-generation wireless technology includes, for example, fifth generation (5G) wireless including sub-3 GHz frequency band, mmWave band and C-band implementations. Network expansion includes adding service and connectivity for residences and enterprises such as small businesses. Thus, network operators are focused on building and deploying networks.

There is no currently available technology or tools to assist with an end-to-end deployment process. Some aspects of network development may have assistive technology. For example, some forecasting tools may enable development of a forecast of future service demand or subscriber growth. However, there are no tools to take a forecast and prioritize, for example, site locations for network build-out to meet the forecasted demand. Still further, there are no tools to assess a network deployment relative to the previously forecasted demand. Other factors to consider include an existing base of subscribers and their future growth needs.

Conventional systems generally rely on a manual process of network design and coordination of build-out. Data relevant to each network expansion project is managed in spreadsheets which are shared among different personnel and different functions. Spreadsheets take inputs from various other spreadsheets and functions. Typically, for each network expansion project, the build plan is continuously updated. Frequent updates and changes are due to changes at the front end of the process, such as subscriber demand and forecast, and downstream, such as traffic throughput and logistics of network buildout. Conventional network development projects are difficult, time consuming and prone to human errors to align and correlate data across various spreadsheets in order to rework plan, assess upstream and downstream impacts, analyze what-if scenarios and generate reports for managing the process.

Moreover, building out a network is becoming a near-real time process. Currently, world-wide supply chain issues have made the availability of necessary technology such as semiconductors uncertain. The physical building of the network is dependent on the availability of components including hardware and software. Unless the necessary devices are in hand, and the necessary software is ready for installation, the network cannot be developed, regardless of other inputs such as planning, financing, and so forth. Moreover, a network operator may have multiple projects competing for resources.

As a result, communication network build-out is becoming similar to an assembly line process. An assembly line allows more efficient assembly of a physical product. The assembly line allows and requires that all needed inputs for a product be brought together at the right time and the right place to be combined to produce a completed product. Further, indirect inputs to the product such as planning and procurement and testing and deployment are functionally part of the assembly line process as well.

Moreover, the assembly line model is applicable to all types of telecommunications networks. Build-out of a wireless network such as wireless access 120 (FIG. 1) raises the same issues as build-out of a broadband network such as broadband access 110. There are some unique aspects to each, such as licensing wireless spectrum, but much of the process or building-out a wireless network is matched by the process of building out a broadband or other telecommunications network.

FIG. 2A illustrates exemplary components of an integrated network deployment system 200 which may be used for build-out of different communications networks such as the access networks of FIG. 1. The integrated network deployment system 200 in this example includes a planning portion including plan of demand module 202 and a plan of record module 204, and an execution portion including a plan of execution module 206. The plan of demand module 202, the plan of record module 204 and the plan of execution module 206 may include any suitable combination of hardware and software to perform the functions described herein. In general, the plan of demand module 202, the plan of record module 204 and the plan of execution module 206 are implemented as one or more data processing systems including one or more processors and memory storing instructions and data. The data processing systems receive input information from a variety of sources and the plan of demand module 202, the plan of record module 204 and the plan of execution module 206 operate to share information about design, development, build-out, testing and other aspects of a plurality of communication networks. Information and know-how developed by the components of the integrated network deployment system 200 during development of a first communication network may be used and extended to development of a second communication network, even when the underlying communication technology varies.

The plan of demand module 202 collects information from a variety of sources. In a typical application, product teams manage networks as the networks are being deployed. Each product team for each network includes hardware engineers, software engineers, etc. The product team develops a plan of demand based on input information such as new technologies becoming available and new regions or populations requiring network service, as well as existing regions and populations that are forecast to change in size. For example, as new 5G cellular technology becomes available, the product team will develop a forecast for numbers of new subscribers and a rate of take-up by the new subscribers. The forecast also includes subscribers who switch to the new 5G cellular technology and away from existing technology, such as third generation (3G) cellular technology. The product team may forecast that 3G cellular technology and service may be discontinued in favor of later-developed technology, with concomitant migration of 3G subscribers to the later-developed systems.

In a similar example, the technology may include broadband networks. The product team may identify new regions and populations to extend an existing broadband network, such as a new residential subdivision or office park that may be a source of new subscribers. Similarly, the product team may identify a new product or service, such as augmented reality gaming applications, which may create a new market for services or respond to a new demand for services.

The product team uses forecasts and other information in collaboration with the plan of demand module 202 to develop the plan of demand. In embodiments, the plan of demand may include information about a number of points of delivery to build on or bring on line for a given network for a given time period, such as a calendar year or a fiscal year. A point of delivery, or PoD, is a module of network, compute, storage, and application components that work together to deliver networking services. For example, a PoD may be a repeatable design pattern, and its components maximize the modularity, scalability, and manageability of network facilities such as data centers. The modular design principle has been applied to telephone and data networks, for instance through a repeatable node design describing the configuration of equipment housed in point of presence facilities. A PoD may also be used in cable video networks to describe the modular component that delivers video service to a subscriber. A PoD generally is a deployable module which delivers a network service to one or more subscribers. The PoD design pattern may be especially important in service provider infrastructure, such as in datacenters supporting cloud computing services, in order to sustain scalability as usage grows.

Further, the plan of demand may include information about use case types, such as individual products or groups of subscribers. The use case types may define network conditions or operational parameters that must be met in the design of the new or expanded network. An example is a virtual reality application operating on a broadband network in which individual subscribers have respective applications on their home gaming equipment that interact over the network with a game-provider or network provider application. The gaming application may require certain network performance such as reduced latency and high bandwidth.

Further, the plan of demand may include in embodiments PoD assignments and geographic locations. A PoD may include a module or network slice that is assigned to a particular network branch or set of subscribers or a particular network. For example, for a high-speed, low latency network developed for a virtual gaming application, particular PoD equipment may be identified and assigned by the plan of demand module 202. Similarly, if a wireless network is to be built-out to provide a new service or technology to a new geographic area, the plan of demand module 202 may designate PoD equipment for particular geographic locations.

In other examples, the product team may design network branches for carrying particular network traffic at forecast levels. The plan of demand module 202 uses forecast of traffic growth over time as an input for developing a network plan.

The plan of record module 204 similarly receives a set of inputs. These inputs include the information developed by the plan of demand module 202. These inputs further include information from a site preparation team and information from a transport team. The site preparation team includes persons responsible for identifying physical locations for network equipment, such as real estate and structures for cellular base stations and network switching stations in locations that correspond to geographic locations specified by the plan of demand module 202. Further, the site preparation team, working through the plan of record module 204, may design and specify support equipment such as physical space or structures for containing network equipment, electrical power for the equipment and heating, ventilation and air conditioning (HVAC) design for the equipment and the space.

In embodiments, the plan of record module 204 receives inputs from a transport team related to logistics and delivery of equipment. Logistics relates to coordination of supply of materials to individual network sites identified by the plan of demand module 202. Equipment and components are identified and transportation is arranged to get the equipment and components to the required site at the time required. In that regard, further inputs include need-by dates, indicating when one or more items are required to complete an assembly or other construction effort, priority information and financial information such as budgets and funding sources for the network build-out.

The plan of execution module 206 implements processes and routines for actually building out the new or augmented network. The plan of execution module 206 receives inputs from the plan of record module 204. Further, the plan of execution module 206 receives input information from other sources and processes that define delivery milestones for those other sources, such as when aspects of the new network must be online and operational, and to what extent. For example, during an initial development phase, a network throughput of 100 Mbps may be acceptable for installation and testing of equipment. However, after a set date, network throughput must be increased to the level planned at the plan of demand module 202, such as 100 Gbps.

The plan of execution module 206 may further receive or develop timeline information defining timing of various milestones for the project. In embodiments, this includes end-to-end (E2E) timelines for executing the infrastructure buildout before service is initiated. For example, structures must be built before power is provided, equipment is installed after the electric power is available, and software is downloaded to make the equipment functional and ready for service.

Further, the plan of execution module 206 is routinely updated to reflect new or changed input information. For example, a change in design at the plan of demand module 202 may be reflected in a modification to site requirements at the plan of record module 204. This, in turn, is reflected in the inputs provided to the plane of execution module 206.

Figure 2B:
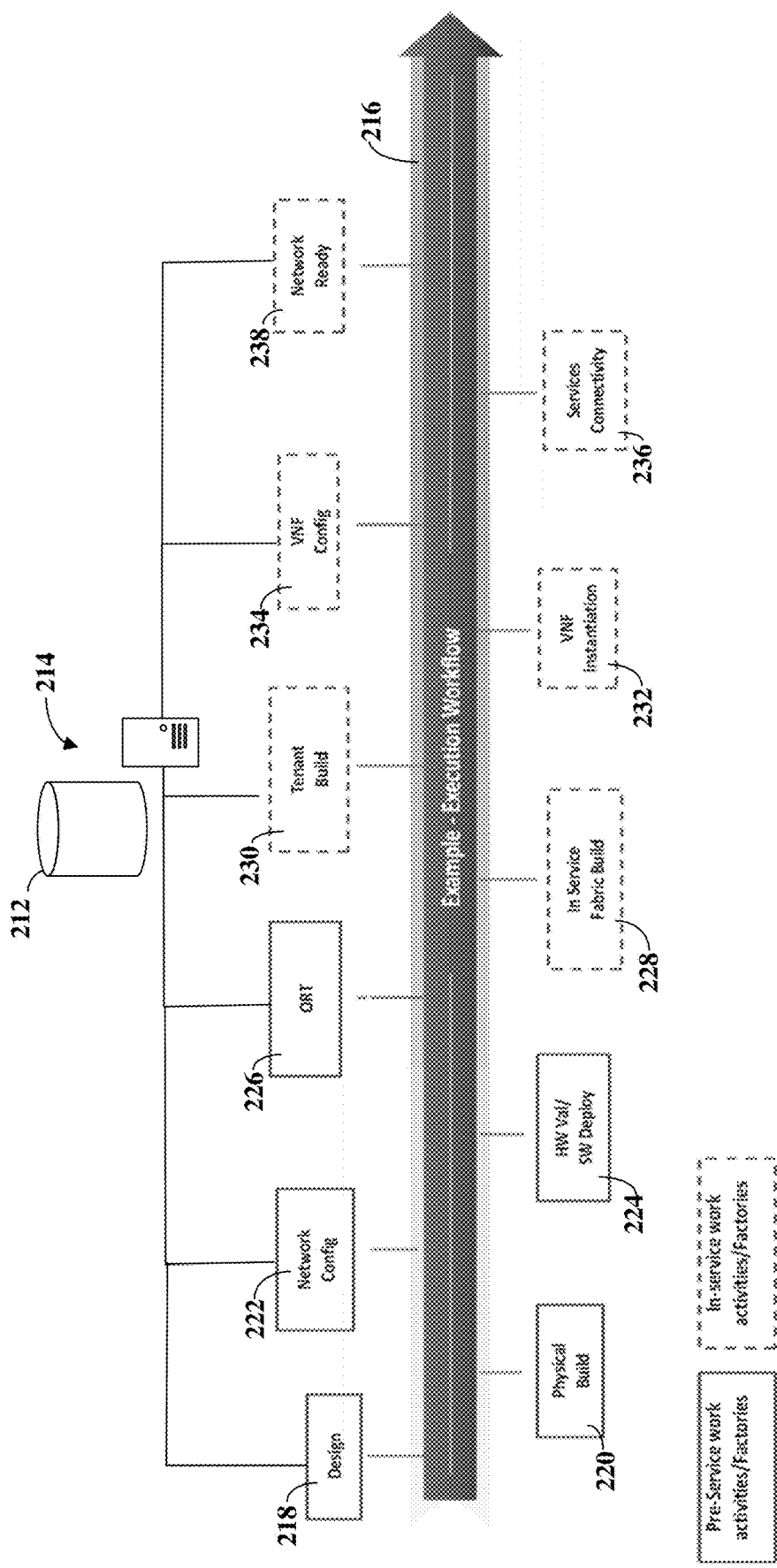
FIG. 2B is a block diagram illustrating an example, non-limiting embodiment of functional block diagram illustrating operation of an integrated network deployment system functioning within the communication network of FIG. 1 in accordance with various aspects described herein.

FIG. 2B is a block diagram illustrating an example, non-limiting embodiment of functional block diagram illustrating operation of an integrated network deployment system 210 functioning within the communication network of FIG. 1 in accordance with various aspects described herein. FIG. 2B illustrates orchestration and workflow integration that may be required to connect the planning portion, such as plan of demand module 202 and plan of record module 204, and the execution portion, such as plan of execution module 206 of the integrated deployment system 200 of FIG. 1.

FIG. 2B illustrates a workflow automation for network deployment of a telecommunications network. The workflow automation may be adapted and extended to different types of networks by a network operator. The integrated network deployment system 210 includes a processing system 212 implementing an orchestrator 214 and the workflow 216. Orchestration is the automated configuration, coordination, and management of computer systems and software. In the context of cloud computing, the main difference between workflow automation and orchestration is that workflows are processed and completed as processes within a single domain for automation purposes, whereas orchestration includes a workflow and provides a directed action towards larger goals and objectives.

The workflow 216 includes a number of milestones that may be performed or met during planning and execution of a telecommunications network. Each respective milestone may be termed a milestone process which accomplishes a defined task. The milestones shown in FIG. 2B are exemplary only. Further, different particular networks may require different milestones so that some of the exemplary milestones of FIG. 2B may be eliminated or modified and some additional milestones may be added for particular network development efforts. As illustrated by the dashed and solid lines in FIG. 2B, some of the exemplary milestones include work or activities to be performed or completed before network service is initiated (solid lines) and some of the exemplary milestones include work or activities to be performed or completed after the network service is initiated.

In the illustration of FIG. 2B, the processing system 212 implementing the orchestrator 214 is in data communication with each of the milestones of the workflow 216. To simplify the drawing figure, not all connections between respective milestones of the workflow are shown. Such data connections may be over wireline or wireless communication networks.

The milestones of FIG. 2B may be analogized to factories. Each respective milestone represents a factory to perform or complete a task. The overall task to be completed is the design and build-out of a telecommunications network, and the processes of the overall task are controlled by the processing system 212. Each of the factories or milestones is responsible for assembling some piece of the completed network.

Each of the factories or milestones of the workflow 216 may include suitable technology such as data processing equipment and communications equipment to enable completion of a task associated with the milestone. For example, a design milestone 218 may include equipment to collect information about design requirements, financial availability and network capabilities. Moreover, each respective milestone of the workflow 216 may communicate with other milestones of the workflow 216 to provide, receive or share updates and modifications. Such updates and modifications are also shared with the orchestrator 214 of the data processing system 212.

The orchestrator 214 includes software including data and instructions for controlling the processing system 212. The processing system 212 is shown as a single integrated data processing system with a processor and memory that communicates data among the orchestrator 214 and the workflow 216. In embodiments, some or all of the respective milestones of the workflow 216 may include one or more respective processing systems that together coordinate the build-out of the finished network.

The orchestrator 214 enables cooperation among the respective milestones of the workflow 216 and coordinates the handoffs between the different milestones. The orchestrator 214 responds to data and other systematic cues from applications running on the workflow 216 that are provisioning the network itself. These cues from the milestone processes represent feedback to the orchestrator 214 regarding the progress of each respective milestone. The feedback from the milestone processes informs the orchestrator about the status of the overall workflow 216 and give a view of what the factory throughput it and gives insight into how human capital is performing.

In the exemplary embodiment of FIG. 2B, the workflow 216 includes a set of milestones that represent operations to be performed in the design, development and build-out of a telecommunications network. The workflow 216 may be applied to any telecommunications network, such as broadband access 110, wireless access 120, voice access 130, media access 140 of FIG. 1. The milestones represent aggregated know-how and technology to perform each particular step in the process represented by the workflow 216. During the design, development and build-out of a telecommunications network, the aggregated knowledge and technology are used to complete each step. Since each network is unique in some respects, whether it be communications technology, geography, or interconnections, the process of design, development and build-out of the telecommunications network will result in additional know-how and technology. Solutions to problems in the current network can be saved and used in future networks.

A first milestone is the design milestone 218. The design milestone 218 includes a process of receiving inputs about requirements for a new or expanded communications network as well as resources for the new or expanded network. Using available tools, a design team specifies a design for the new or expanded network, including technology, facility location and interconnection, and other features.

A second milestone is a physical build milestone 220. The physical build milestone 220 may receive inputs from the design milestone 218 and other sources. The physical build milestone 220 includes a set of processes to acquire necessary real estate, devices and equipment, and support personnel to locate and install the components of the new or expanded network. The processes may be monitored by a suitable processes and progress reports provided to other milestones of the workflow 216 as well as the orchestrator 214.

A third milestone is a network configuration milestone 222. The network configuration milestone 222 may receive inputs from the design milestone 218 and the physical build milestone, for example, to enable software and hardware configuration of the network equipment designed at the design milestone 218 and installed at the physical build milestone 220. The network configuration milestone 222 may include, for example, configuration of cellular base stations to provide radio access to designated areas or interconnection of new or expanded broadband equipment with existing network equipment.

A fourth milestone is a hardware validation and software deployment milestone 224. This hardware validation and software deployment milestone 224 may include steps such as testing the installed equipment and interconnections with other network equipment, and a process of ensuring that software controls suitably communicate with other network equipment.

A fifth milestone in the example workflow 216 of FIG. 2B is an operational readiness testing milestone 226, or ORT. The operational readiness testing milestone 226 includes processes for full testing of all components of the new or expanded network to ensure that the components are capable of fulfilling the design requirements. Thus, the operational readiness testing milestone 226 may receive inputs from the design milestone 218 defining technical and operational requirements of the new or expanded network. Operational testing may include processes of testing the equipment of the network beyond the design requirements, such as at throughput levels exceeding the design value, to ensure robustness of the implementation under extreme or challenging conditions.

Following completion of the operational readiness testing milestone 226, the new or expanded network is available for use by the network operator or clients or tenants of the network operator. Pre-service work activities or factories, indicated by solid lines in FIG. 2B, are complete and in-service work activities or factories begin operation.

A sixth milestone in the example workflow 216 of FIG. 2B is an in-service fabric build milestone 228. The fabric of the network refers to the connectivity between various devices of the network that give throughput between the network and edge devices to provide core network functions. The in-service fabric build milestone 228 may include steps of connecting the network components, via hardware and software, to edge devices and tenant devices.

A seventh milestone is a tenant build milestone 230. The tenant build milestone 230 includes processes in which tenant devices are connected to the new or expanded network. A tenant may be an organization that leases or otherwise acquires data communication capability from the network operator over the new or expanded network. The tenant may be an organization within the organization of the network operator itself. The tenant build milestone 230 may include processes of connecting tenant equipment to the new or expanded network and testing interoperability of the tenant devices with other network equipment.

An eighth milestone is a virtual network function instantiation milestone 232. A virtualized network function (VNF) runs on a virtual machine on top of a networking infrastructure. The VNF may be responsible for managing specific network functions, such as a router, a switch and others. A VNF allows a network function to be implemented in software on a conventional data processing device such as a switch or server instead of having custom hardware devices to perform the specified functions. The virtual network function instantiation milestone 232 may include processes of installing the VNF function on designated machines and may include as inputs information about the design from the design milestone 218.

A ninth milestone is a virtual network function configuration milestone 234. The virtual network function configuration milestone 234 may include processes of customizing or adapting the VNF instantiations from the virtual network function instantiation milestone 232 to a particular purpose in the network.

A tenth milestone in the example workflow 216 of FIG. 2B is a services connectivity milestone 236. The services connectivity milestone 236 may include processes of identifying services to be performed by the new or expanded network and verifying that those services are available and will be reliably performed. In an example, if the new or expanded network is a cellular communication or mobility network, services include connection by a subscriber device to a base station of the network and handover of communication from the base station to another base station to provide mobility. The services of attachment and handover may be tested, including core network operations of updating information in control devices of the core network.

An eleventh milestone in the example workflow 216 of FIG. 2B is a network ready milestone 238. The network ready milestone 238 includes processes of final testing and checkout of all network functions and a certification that the new or expanded network is operating as designed at the design milestone 218, including any modifications imposed since the completion of the design.

In conventional workflows, a single current network design and build-out is planned and implemented. The workflow may be partial and cover some steps, such as design and installation or post-installation testing. There may be processes in place by which to collect data in real-time from downstream processes executing the plan. However, the workflow and organization implementing the process is constantly challenged to reduce intervals of work activities and improve overall infrastructure build timeline, but no data is readily available to model optimization of business operations, identify bottlenecks and dependencies, etc. Each independent process tracks and keeps progress data in multiple systems and formats making it difficult for individual processes or managers to know what is happening. The conventional workflow can make it difficult to predict how well the execution workflow will meet the timeline required in the build plan and, if necessary, make timely adjustments.

A conventional network design and build-out relies on repetitive human actions. The knowledge and know-how are contained within the knowledge and experience of the individuals involved in a project. The knowledge and know-how include, for example business rules and processes as well as experience based on previous project involvement. The system and method in accordance with aspects described herein are implemented in an orchestrator 214 and workflow 216 with given milestones within a virtual factory. The data processing system 212, implementing the orchestrator 214 and the workflow 216, then drive the process. Automating the process and removing the repetitive human actions eliminates mistakes but still captures the human know-how. Changes to development requirements are accommodated automatically by the orchestrator 214 and the workflow 216.

Current software solutions are fragmented among different portions of a project. There exists no single solution that allows a team to effectively build an annual plan of action and track progress and productivity versus the plan. Further, there is no product available that allows a team to connect together overall milestones for deploying a network, along with human capital and any other systems applications put in place to give the team an understanding of what is flowing through the virtual factory.

An integrated network deployment system in accordance with various aspects herein eliminates the conventional process of building a one-off network every time a new service is to be deployed. Instead, a generic network can be defined and customized according to current needs for the new service. The generic network can be customized using basic network engineering principles and software design principles.

A design and build-out of a new or expanded network may involve placement and connection of many hundreds of network routers, switches and servers. For such a large project, it can be easy for managers to lose track of the status of individual processes and, by extension, of the overall process. Also, changes may occur during the design and build-out process, such as additional network growth, which may not be recognized during network build-out. The result is a new or expanded network that fails to meet requirements or provide the expansion needed to match forecast growth.

An integrated network deployment system in accordance with various aspects herein provides substantial improvements over the conventional workflows. In particular, the integrated network deployment system may be extended to the widest variety of telecommunication networks for design and build-out, including wireless networks, broadband networks, and others.

For example, the integrated network deployment system uses automatic data collection, reporting and processing to eliminate manual compilation of spreadsheets. A common repository is used for data from the plan of record module 204 and the plan of execution module 206 (FIG. 2A). The common repository may be part of the data processing system 212 which implements orchestrator 214 (FIG. 2B). The orchestrator 214 may be employed to run complex modeling scenarios with the data from the plan of record 205 and the plan of execution module 206. The modeling considers end-to-end throughput, supply chain and other various logistics that are part of designing and physically building out the network. Further, the orchestrator 214 creates orchestration workflows such as workflow 216 to manage the delivery of operational tasks like a virtual assembly line. The orchestrator 214 may ingest data from existing data sources, such as spreadsheets, application programming interfaces of various design and build equipment, etc., creating a very rich set of data on which to operate. Further, the orchestrator 214. may collect existing reporting artifacts for consumption into the new solution.

This process provides substantial benefits relative to the conventional network design process. For example, an apparatus and method in accordance with aspects disclosed herein operate to drive significant time savings and reduce human error as well as manual touches of the data in various repositories. Further, the apparatus and method serve to reduce the amount of time mapping and correlating data. Conventionally, this may be a multi-week process. The system and method provide an ability to plan, forecast and reforecast the current progress of a network infrastructure build and tenant deployment plan.

Further benefits include an ability to use model results to make decisions based on current trends in pipeline data in the workflow. Data from each milestone process is shared so that all milestone processes are fully away of status of each process at all times. Further, the method and apparatus provide an ability to proactively adjust the build plan based on adjustments of the forecast. Still further, the method and apparatus provide an ability to create multiple scenarios, to analyze what-if questions, and make the scenarios visible in real time.

Further benefits include an ability to use machine learning capabilities to create modeling scenarios. In an example, the data processing system 212 implements a machine learning (ML) process or an artificial intelligence (AI) process to analyze workflow and orchestrator data. The ML/AI process may operate to identify patterns in the data or to extend a design or workflow for one network, such as a broadband network developed in the current year, to a second network such as a wireless network developed in a second year. For example, a neural network may be used to model relationships between inputs and output of one or some processes of a workflow such as workflow 216 to find patterns in the data. The neural network may implement a classification operation including pattern recognition and sequence recognition, for example.

The system and method in accordance with aspects herein provide a tool or set of tools to enable deployment of a new or expanded communications network with minimal effort. The experience and know-how of previous network development efforts, even for networks using different communication technologies like wireless and broadband, is captured and used by the tool in the new network development.

Further, the use of the orchestrator 214 and the workflow 216 allow the network provider to build in all types of specific templates for a business model that may be desired. For example, a business model for a first-responder network, in which police, fire and other first-responder personnel have high priority and high reliability for communications, may be extended from a broadband or other wireline implementation to a new wireless network. Rules and solutions developed for the wireline implementation may be adapted, automatically by the orchestrator 214 and the workflow 216, from the knowledge of the wireline development to the development of the wireless network.

Moreover, some human effort and personnel can be removed from the network development effort by use of the method and apparatus. The back end of a conventional network development may include personnel performing tasks such as project management or program management to oversee and control acquisition and installation of hardware and software, perform and approve testing and other functions. Much of these tasks involve sequencing and timing of inputs to the overall network build-out process. Such tasks now are the job of data analysts who can review the progress of the orchestrator 214 and the workflow 216 to identify and correct any problems that may occur. Moreover, by automating the tasks and instantiating them as workflow milestones, proper sequencing and timing are also automated and errors are substantially reduced. Equipment and personnel arrive where they are needed, when they are needed, due to the operation of the orchestrator 214 and the workflow 216.

The system and method in accordance with aspects herein enable access to data that may be buried in a network development project and in network operation. The data is processed and made accessible by the orchestrator and workflow. Further, for network designers who must develop networks for customers, they no longer have to go through a repetitive process to stand up a singular project manage feedback loops for every single customer for a network. Work on one project may be automatically carried forward to all types of future projects. Further, data from many projects may be brought together to develop future projects and to help scale the size of the future projects.

Figure 2C:
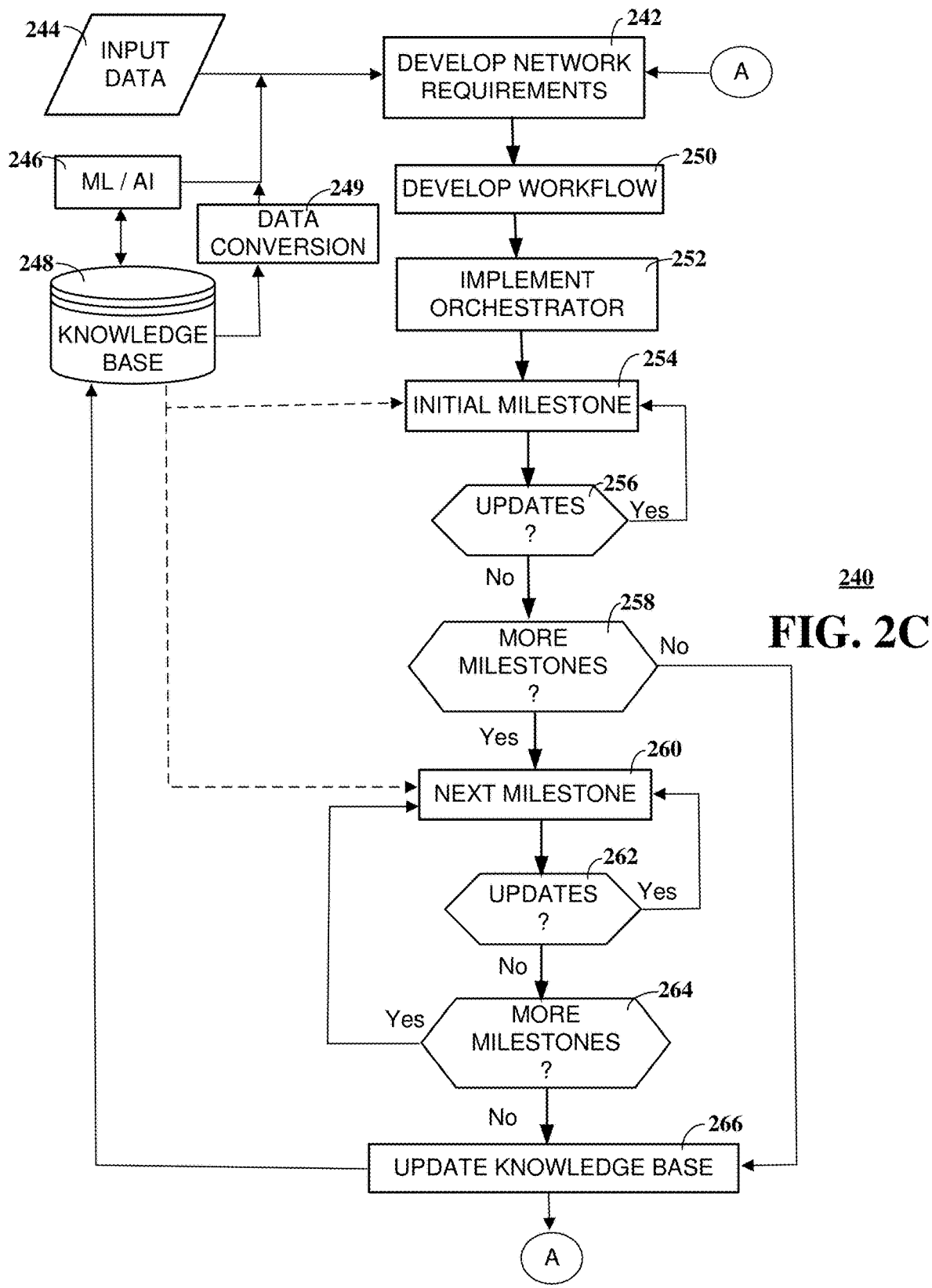
FIG. 2C depicts an illustrative embodiment of a method in accordance with various aspects described herein.

FIG. 2C depicts an illustrative embodiment of a method 240 in accordance with various aspects described herein. The method 240 may be implemented by an integrated network deployment system such as the integrated network deployment system 210 of FIG. 2B or by a tool for development and deployment of a new or expanded telecommunications network. The method 240 receives input information about network requirements and develops an orchestrator and a workflow which include a plurality of process steps for developing the network. The orchestrator and workflow automatically manage a plurality of processes or milestones to manage the network development and deployment. Information is collected and shared automatically among the respective processes so that the overall method 240 produces the telecommunications network like an integrated, virtual factory. Knowledge or know-how about the development of the network may be gathered in a knowledge base so that the tool can be reused without limit for development of future networks.

The method 240 begins at block 242. Requirements for a new or expanded network are developed. Such requirements may include information about communication technology, such as wireless or broadband. Such requirements may include information about throughput (in Mbps or Gbps, for example), latency, and other technical specifications. Such requirements may include information about a customer who will be a tenant on the network, including the customer requirements. Such requirements may include geographical information, including endpoints to be served, other networks for connection, etc.

In embodiments, block 242 may receive input data from any suitable source. Sources may include customers or potential customers and financial sources including information such as budgeting information. Sources may also include network engineers with knowledge of past or related networks.

In some embodiments, block 242 may receive input data from a machine learning or artificial intelligence source, designated ML/AI in FIG. 2C. The ML/AI source may, in turn, access a knowledge base 248 of network information. The ML/AI may search for patterns in data to draw conclusions from the stored data that may be useful and inform the process of network development of block 242.

The network information stored in the knowledge base 248 may include information about past network development projects, including any information that may be useful for the network development process of block 242. Thus, the network information stored in the knowledge base 248 may include historical information about past network development projects and current information about existing networks.

The network information stored in knowledge base 248 may include the widest variety of information and data, organized in any suitable manner. For example, the network information may include technical information about previous network designs and performance, financial information about previous networks, commercial information about component suppliers including information about current product availability and supplies, other commercial information about current customers and tenants and past customers and tenants. The network information in knowledge base 248 may be organized as spreadsheet data, database data, marketing data, and other formats.

Accordingly, some of the data in the network information stored in knowledge base 248 may be incompatible with or incommensurate with other data of the network information in the knowledge base. For example, technical data about network configuration and throughput may not map well to financial information about component costs, traffic projections and profit and loss requirements.

Accordingly, in some embodiments, a data conversion process of block 249 operates to convert data of the network information in the knowledge base 248 to a common data format that can be readily used by the process of block 242. The common data format may have any suitable format or group of formats that enable the network information to be readily and rapidly processed together. For example, data having varying formats in terms of record length and content may be converted to a consistent record format, such as a header and payload. The header identifies the nature of the data, such as a first header for technical or engineering data, a second header for financial data, etc. The header may include additional fields or sub-fields to further define the data. The payload may include the value associated with the data, such as a budgeted amount for server purchases for a previous network development project. The data conversion block 249 and the process of block 242 operate from a common dictionary or schema to unify and make common the data shared between the knowledge base 248 and block 242.

After requirements for the network are developed at block 242, at block 250, a workflow is developed to implement the network development project. An example of a suitable workflow is workflow 216 of FIG. 2B. The process of block 242 determines the particular combination and order of milestone processes that form the workflow of block 250. Determination of milestone processes is based on the input data 244, information from the ML/AI process 246 and the network information from the knowledge base 248. Thus, the workflow is developed based on current requirements for the network as well as past history of previous network development projects.

At block 252, an orchestrator is implemented to manage the workflow developed at block 250. The orchestrator enables automated configuration, coordination, and management of the computer systems and software that implement the network development process. The workflow of block 250 may be processed and completed as processes within a single domain for automation purposes. The orchestrator may include one or more workflows and provides a directed action towards larger goals and objectives, such as the design, development, build-out, testing and activation of the telecommunication network.

In an embodiment, a single data processing system such as data processing system 212 of FIG. 2B may implement the orchestrator. Alternatively, any suitable number of data processing systems, networked or in data communication, may implement the orchestrator. In some embodiments, the orchestrator may be implemented among a number of computing devices located in the cloud.

The workflow developed at block 250 generally includes a sequence of independent operations or milestone processes and is thus implemented on a number of independent processing systems. The sequence of milestone processes may be implemented by a variety of teams or groups with respective responsibilities and expertise. One team may be responsible for network design. Another team may be responsible for network testing. Yet another team may be responsible for asset acquisition and installation. Yet another team may be responsible for project financing. Each team may represent or be responsible for a particular milestone process. Each milestone process may be analogized to a step in an assembly line in a factory, and the overall network development process may be analogized to the factory. Each step in the assembly line is dependent on previous steps, and some steps may take input from upstream or downstream steps in completing assigned tasks of the workflow and the milestone processes. The orchestrator controls the overall operation of the virtual factory.

At block 254, a first or initial milestone process of the workflow is identified. In the example workflow 216 of FIG. 2B, the design milestone is the initial milestone. Work and tasks to be accomplished in the initial milestone is specified by the workflow, along with deliverable items and information. For example, for the design milestone, the required output or deliverable may be a network diagram specify all network components such as servers and switches and specifying manufacturer, model and price, as well as information specifying all required data communication resources, such as broadband cables, fiber optic links and other hardware.

The operation and performance of the initial milestone process 254 may include receiving information from the knowledge base 248, as indicated by the dashed line in FIG. 2C. For example, where the design milestone must specify a manufacturer and model for a particular component, the knowledge base 248 may store information about different commercially available devices, or historical information such as connectivity of such devices or long-term reliability of such devices. The knowledge base 248 operates as a store of information and experience and know-how that can be tapped into be individual milestone processes of the workflow.

At block 256, it is determined if there is updated information that may affect the initial milestone process 254. In general, this represents and operation of collecting information about variations or modifications that have originated elsewhere in the workflow or in the knowledge base 248. For example, a network requirement may have changed based on a customer input so that, rather than throughput of 500 Mbps, a throughput of 1 Gbps is now required by the customer. In another example, changed information such as the availability of a particular component such as a router may be affected by current supply chain limitations specified by the knowledge base, requiring a redesign or change in design from a current best design. As the initial milestone process 254 proceeds, the workflow shares information among milestone processes of the virtual factory. In this way, each independent milestone process is aware of relevant issues affecting the milestone processes.

At block 258, it is determined if there are more milestone processes in the workflow. If not, control proceeds to block 266. If there are more milestone processes, control proceeds to block 260.

The method 240 then remains in a loop includes block 260, block 262 and block 264. A next milestone process is begun and completed. During processing of the milestone process, any available information from the knowledge base 248 is retrieved and acted upon. Further, for each milestone process, it is determined if there are updates or modifications originating elsewhere in the workflow or the orchestrator. If so, the milestone process continues until work is completed and there are no more updates to accommodate.

When there are no more milestones in the workflow at block 264, at block 266 the knowledge base 248 is updated with information that has been learned during performance of the method. Alternatively, the knowledge base 248 can be updated during or at the completion of each milestone process, or at any convenient time.

As an example, during an in service fabric build milestone process, such as in service fabric build milestone 228, it may be learned that a particular component is not reliable enough for specified operating conditions and that it was necessary to substitute an alternative component. At block 266, this information may be shared in the knowledge base 248. Similarly, if it was learned during a physical build milestone process that a particular contractor provided excellent quality work according to budget, this information may be shared to the knowledge base 248.

Such information in the knowledge base 248 becomes available for future telecommunication network development projects. In effect, the collected wisdom and experience of each network design and deployment is gathered and stored, in this example, in the knowledge base 248. The information is then used to develop a workflow for future projects and to control performance of individual milestone processes of the future projects.

Following completion of block 266 and updating the knowledge base 248, the new or expanded network is operational and available for use. As indicated by the connector labelled "A" in FIG. 2C, control returns to block 242 to begin development of another new or expanded telecommunications network. Thus, the method 240 forms a tool for network development that may be extended to any type of network including any technology and any configuration. Each successive network development process develops new know-how and expertise that is automatically captured and stored in a knowledge base such as knowledge base 248 for further network development projects. The overall method 240 is thus an integrated, end-to-end solution for network development and rollout.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
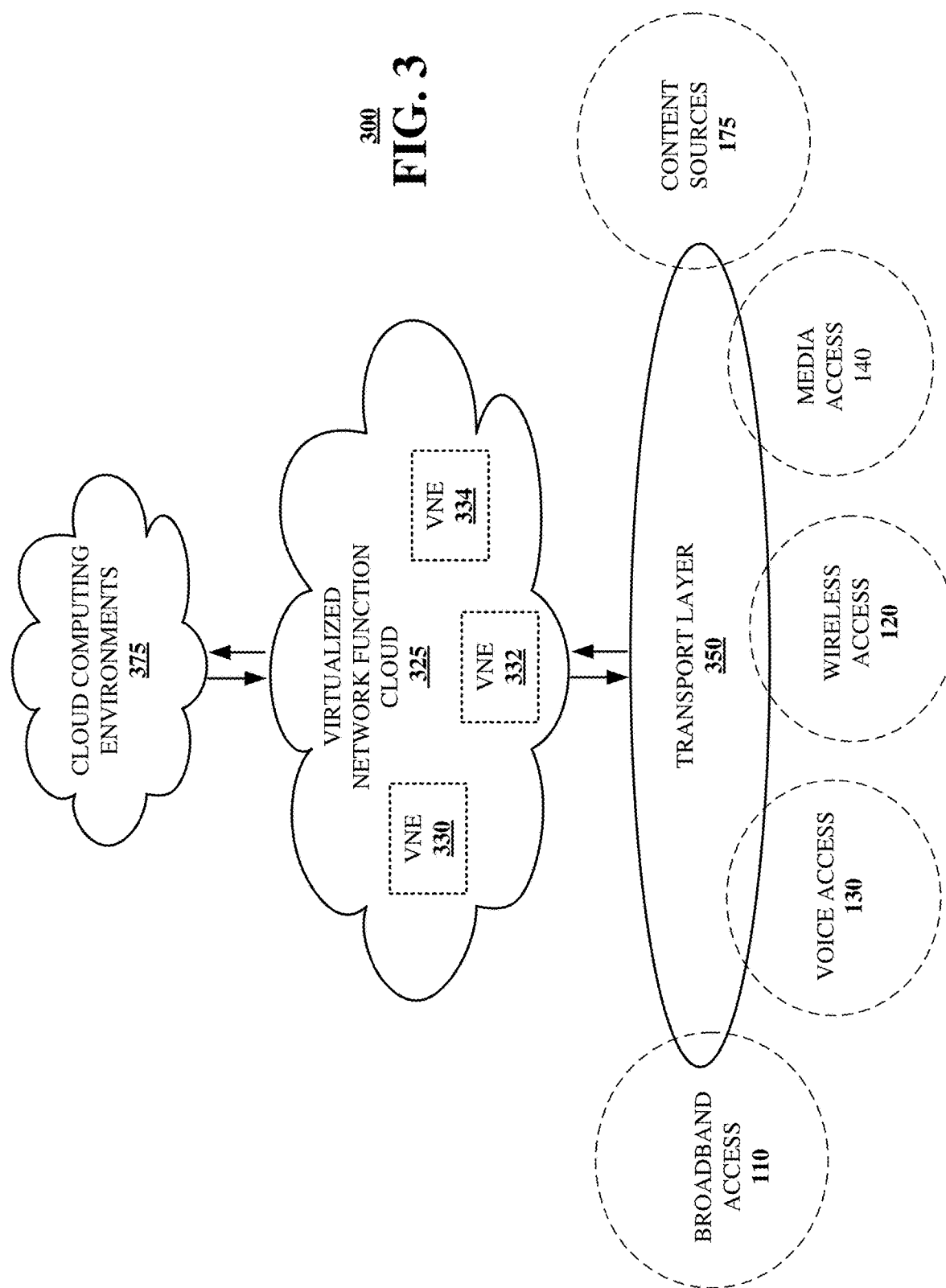
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part in the development of a new telecommunications network. The new telecommunications network may use any communication technology including wireline and wireless and have any requisite capacity and capability. Development is done using automated processes and workflows based on input conditions and stored historical information about past network development projects.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
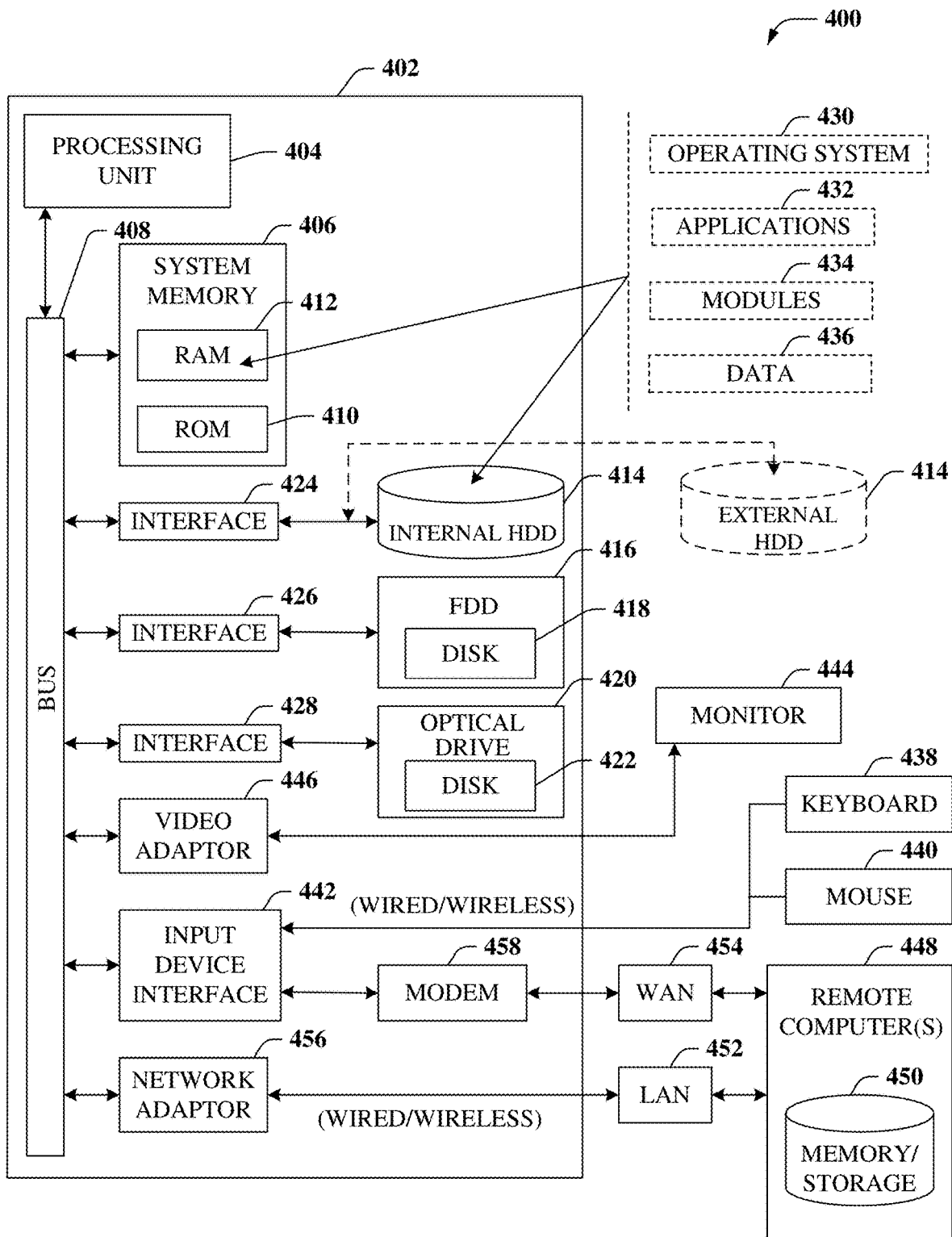
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the development of a new telecommunications network based on automated processes and workflows developed automatically in response to received input conditions and stored historical information about past network development projects. The stored historical information can be updated with know-how from the current network development project to accumulate knowledge over time.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
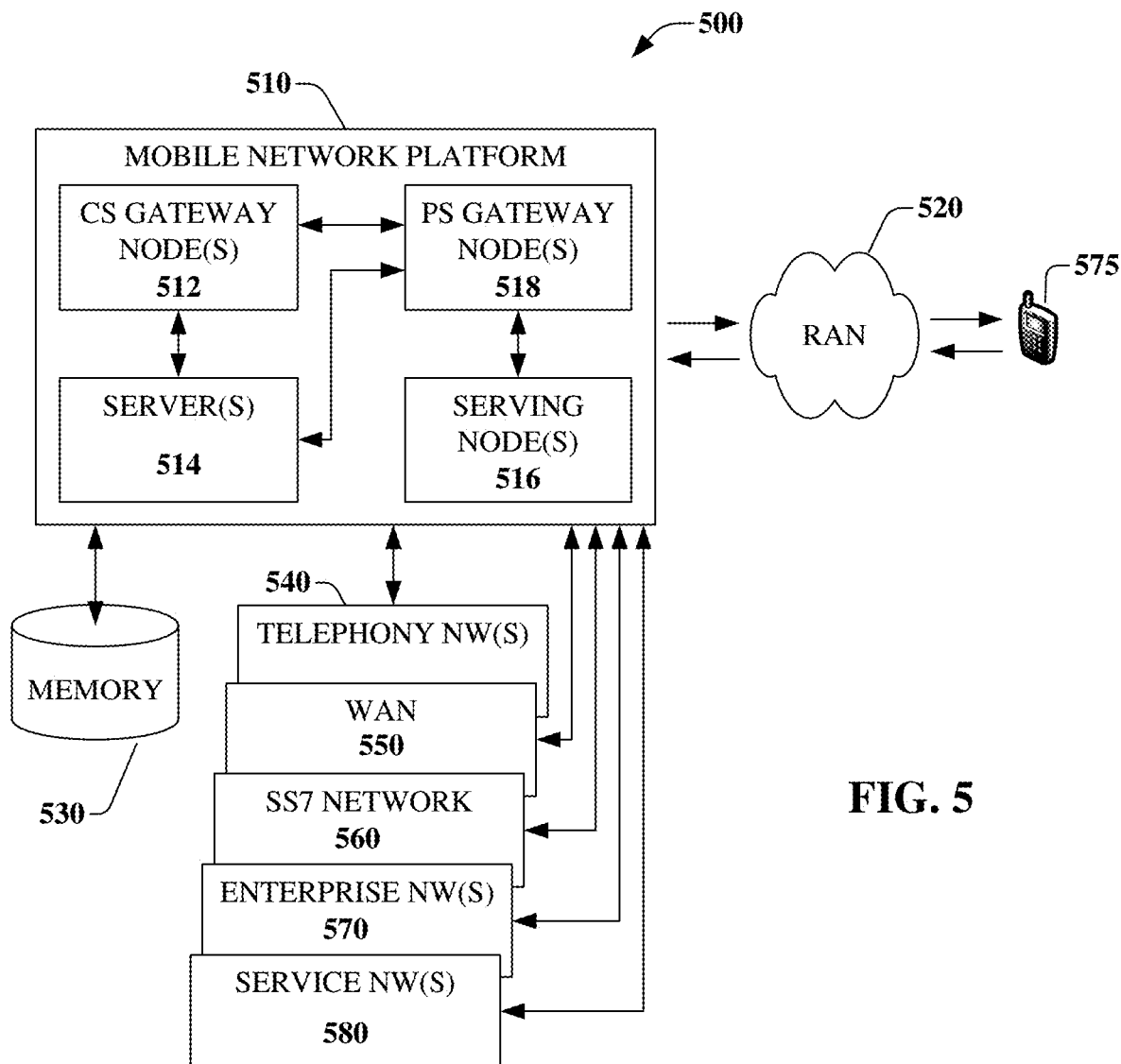
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the development of a new telecommunications network including a mobile network platform such as platform 501 or a wireline communications network. The new telecommunications network may have any requisite capacity and capability. Network development is completed using automated processes and workflows. The workflows are automatically developed for the particular project based on specified input conditions and stored historical information about past network development projects. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network

560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
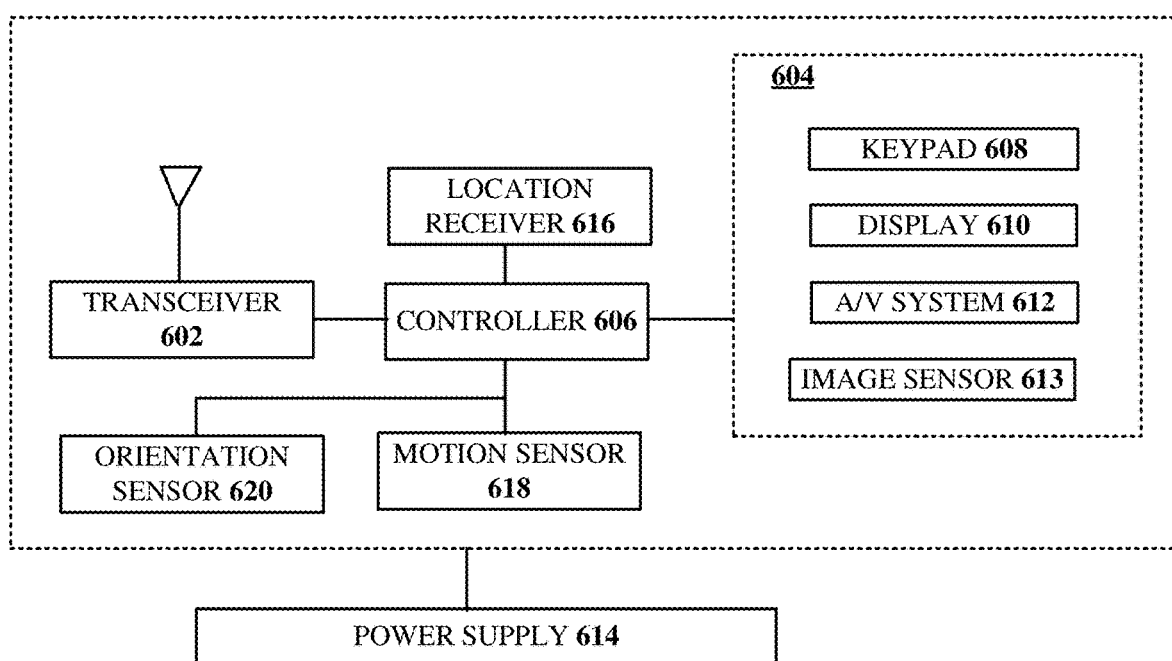
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the development of a new telecommunications network. The computing device 600 may implement one or more processes for automatically developing the new telecommunications network. The new telecommunications network may use any communication technology such as wireline and wireless and have any requisite capacity and capability. Development is done using automated processes and workflows based on input conditions and stored historical information about past network development projects. The computing device 600 can cooperate with other similar computing devices in the automatic network development project.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving network requirements for a new telecommunications network;
retrieving stored knowledge base data about past telecommunications network projects;
based on the network requirements for the new telecommunications network and the stored knowledge base data, developing a workflow for development of the new telecommunications network, the workflow including a plurality of milestone processes;
based on the network requirements for the new telecommunications network and the stored knowledge base data, developing an orchestrator for automatically managing the development of the new telecommunications network;
performing respective milestone processes of the plurality of milestone processes; and
initiating operation of the new telecommunications network.

2. The device of claim 1, wherein the developing a workflow comprises:
retrieving, from a knowledge base, information about milestone processes of the past telecommunications network projects; and
developing the plurality of milestone processes for the new telecommunications network based on the information about milestone processes of the past telecommunications network projects.

3. The device of claim 2, wherein the developing a workflow further comprises:
modifying one or more milestone processes of the past telecommunication network projects based on the network requirements for the new telecommunications network, forming a modified milestone process.

4. The device of claim 3, wherein the operations further comprise:
informing other milestone processes of the plurality of milestone processes about the modified milestone process.

5. The device of claim 3, wherein the operations further comprise:
informing the orchestrator about the modified milestone process, the orchestrator operative to modify one or more other milestone processes based on the modified milestone process.

6. The device of claim 2, wherein the developing a workflow further comprises:
developing a network design milestone process;
developing a physical buildout milestone process, wherein the physical buildout milestone process receives as an input information from the network design milestone process; and
developing a network configuration milestone process, wherein the network configuration milestone process receives as an input information from the physical buildout milestone process.

7. The device of claim 2, wherein the operations further comprise:
retrieving, from the knowledge base, financial data of the past telecommunications network projects;
retrieving, from the knowledge base, technical data of the past telecommunications network projects; and
convert the financial data of the past telecommunications network projects and the technical data of the past telecommunications network projects to a common data for developing the workflow.

8. The device of claim 1, wherein the performing respective milestone processes comprises:
identifying updates to the workflow by other milestone processes of the plurality of milestone processes; and
automatically modifying the respective milestone processes according to the updates to the workflow.

9. The device of claim 1, wherein the performing respective milestone processes comprises:
identifying changed information of the stored knowledge base data; and
automatically modifying the respective milestone processes according to the changed information.

10. The device of claim 1, wherein the operations further comprise:
updating the stored knowledge base data with information about the plurality of milestone processes, forming updated knowledge base data.

11. The device of claim 10, wherein the operations further comprise:
receiving network requirements for a subsequent telecommunications network, the subsequent telecommunications network based on different communication technology than the new telecommunications network;
retrieving the updated knowledge base data;
based on the network requirements for the subsequent telecommunications network and the updated knowledge base data, developing a subsequent workflow for development of the subsequent telecommunications network, the subsequent workflow including a plurality of subsequent milestone processes, the subsequent workflow being different from the workflow for development of the new telecommunications network;
based on the network requirements for the subsequent telecommunications network and the updated knowledge base data, developing a subsequent orchestrator for automatically managing the development of the subsequent telecommunications network;
performing respective subsequent milestone processes of the plurality of subsequent milestone processes; and
initiating operation of the subsequent telecommunications network.

12. A non-transitory, machine-readable medium, comprising executable instructions that, when executed by a processing system including a processor, facilitate performance of operations, the operations comprising:
receiving network requirements for a new telecommunications network to be developed by a network operator;
retrieving stored knowledge base data about past telecommunications network projects of the network operator;
developing a workflow for development of the new telecommunications network, the workflow including a plurality of milestone processes, each respective milestone process related to a respective aspect of development of the new telecommunications network, wherein the developing the workflow is based on the network requirements and the stored knowledge base data;

automatically collecting progress information of the plurality of milestone processes;

automatically sharing the progress information among selected milestone processes of the plurality of milestone processes;

storing at least some of the progress information as updated knowledge base data; and upon completion of all milestone processes of the plurality of milestone processes, initiating operation of the new telecommunications network.

13. The non-transitory, machine-readable medium of claim 12, wherein the operations further comprise:

developing an orchestrator for the development of the new telecommunications network, wherein the developing the orchestrator is based on the network requirements and the stored knowledge base data; and managing, by the orchestrator, the plurality of milestone processes.

14. The non-transitory, machine-readable medium of claim 12, wherein the developing a workflow for development of the new telecommunications network comprises:

based on the stored knowledge base data, identifying a plurality of tasks required for the development of the new telecommunications network;

selecting, based on the plurality of tasks required for the development of the new telecommunications network, a set of milestone processes, wherein the set of milestone processes are selected from the stored knowledge base data about past telecommunications network projects of the network operator, forming selected milestone processes; and modifying the selected milestone processes, forming the plurality of milestone processes, wherein the modifying is based on the network requirements for a new telecommunications network to be developed by a network operator.

15. The non-transitory, machine-readable medium of claim 12, wherein the operations further comprise:

modifying one or more of the plurality of milestone processes during performance of one of the plurality of milestone processes, wherein the modifying is based on the sharing the progress information among the selected milestone processes of the plurality of milestone processes to reflect a variation in the performance of the one of the plurality of milestone processes.

16. The non-transitory, machine-readable medium of claim 12, wherein the operations further comprise:

adapting the workflow, including adapting one or more of the plurality of milestone processes, for a subsequent development another telecommunications network to be developed by the network operator, wherein the adapting is based on the stored knowledge base data about past telecommunications network projects of the network operator and other network requirements for the other telecommunications network to be developed by the network operator.

17. A method, comprising:

receiving, by a processing system including a processor, network requirements for a new telecommunications network to be developed by a network operator;

developing, by the processing system, a workflow for design and development of the new telecommunications network, wherein the developing the workflow is based on stored knowledge base data about past telecommunications network projects of the network operator, the stored knowledge base data including information about prior milestone processes of the past telecommunications network projects of the network operator;

modifying, by the processing system, the information about prior milestone processes, wherein the modifying is based on the network requirements for the new telecommunications network, forming a plurality of milestone processes for the new telecommunications network; and performing, by the processing system, respective milestone processes of the plurality of milestone processes to design, develop and test the new telecommunications network, including performing a network ready milestone process of final testing of network functions and a certification that the new telecommunications network is operational to begin initiating operation of the new telecommunications network.

18. The method of claim 17, comprising:

developing, by the processing system, an orchestrator for management of the plurality of milestone processes for the new telecommunications network, wherein the developing the orchestrator is based on information of the stored knowledge base data about past telecommunications network projects of the network operator and the network requirements for the new telecommunications network.

19. The method of claim 17, comprising:

identifying, by the processing system, a variation in performance of a selected milestone process of the plurality of milestone processes; and communicating, by the processing system, information about the variation in performance of the selected milestone process, to other milestone processes of the plurality of milestone processes affected by the variation in performance of the selected milestone process.

20. The method of claim 17, comprising:

storing, by the processing system, in a storage including the stored knowledge base data, information about the performing the respective milestone processes of the plurality of milestone processes for use in developing future telecommunications networks to be developed by a network operator.

* * * * *